(12) United States Patent
Kim (10) Patent No.: US 10,988,017 B2
(45) Date of Patent: Apr. 27, 2021

(54) TRANSMISSION MOUNT FOR VEHICLE (71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 163 days.

(21) Appl. No.: 16/108,692

(22) Filed: Aug. 22, 2018

(65) Prior Publication Data
US 2019/0168597 A1  Jun. 6, 2019

(30) Foreign Application Priority Data

Dec. 1, 2017  (KR) .................. 10-2017-0163850

(51) Int. Cl.
| B60K 5/12 | (2006.01) |
| B23P 19/04 | (2006.01) |
| F16F 1/38 | (2006.01) |
| F16F 15/02 | (2006.01) |

(52) U.S. Cl.
CPC ............ B60K 5/1283 (2013.01); B23P 19/04 (2013.01); B60K 5/1208 (2013.01); B60K 5/1216 (2013.01); B60K 5/1225 (2013.01); B60K 5/1291 (2013.01); F16F 1/3828 (2013.01); F16F 15/02 (2013.01)

(58) Field of Classification Search
CPC .. B60K 5/1283; B60K 5/1208; B60K 5/1216; B60K 5/1225; B60K 5/1291; B23P 19/04; F16F 1/3828; F16F 15/02; F16F 1/3842
USPC .............................. 248/638, 635; 267/140.11
See application file for complete search history.

(56) References Cited

U.S. PATENT DOCUMENTS

| 6,349,918 | B1* | 2/2002 | Bunker ................ B60K 5/1208 248/635 |
| 10,208,847 | B1* | 2/2019 | Lee ........................ F16F 1/3713 |
| 2005/0098374 | A1* | 5/2005 | Moon .................. B60K 5/1208 180/312 |
| 2011/0121157 | A1* | 5/2011 | Park ....................... F16F 1/3828 248/674 |
| 2014/0197299 | A1* | 7/2014 | Oppenheimer ......... F16F 15/04 248/638 |
| 2017/0267090 | A1* | 9/2017 | Kim ..................... B60K 5/1208 |
| 2018/0163842 | A1* | 6/2018 | Kim ..................... F16H 57/025 |

FOREIGN PATENT DOCUMENTS

| CN | 104896006 A | * | 9/2015 | |
| EP | 1319861 A2 | * | 6/2003 | ............ F16F 1/3863 |
| WO | WO-2015170463 A1 | * | 11/2015 | ........... B60K 5/1208 |

* cited by examiner

Primary Examiner — Kimberly T Wood
(74) Attorney, Agent, or Firm — Mintz Levin Cohn Ferris Glovsky and Popeo, P.C.; Peter F. Corless (57) ABSTRACT

A transmission mount for a vehicle is capable of being press-fitted to a vehicle body side member with only an insulator, and without use of a bridge bracket, such that reduction in weight and cost can be achieved by eliminating the bridge bracket, and assembly workability can be improved by eliminating a bolting operation.

7 Claims, 8 Drawing Sheets

FIG. 12

TRANSMISSION MOUNT FOR VEHICLE

CROSS-REFERENCE TO RELATED APPLICATION

This application claims under 35 U.S.C. § 119(a) the benefit of Korean Patent Application No. 10-2017-0163850 filed on Dec. 1, 2017, the entire contents of which are incorporated herein by reference.

BACKGROUND

(a) Technical Field

The present disclosure relates to a transmission mount for a vehicle, and more particularly, to the transmission mount capable of being press-fitted to a vehicle body side member.

(b) Description of the Related Art

In general, when a power train including an engine and a transmission is mounted in an engine compartment of a vehicle, the power train is mounted using mounting members in a three-point support manner to control vibrating and rolling behavior.

The mounting members include an engine mount that is mounted between the engine of the power train and a vehicle body to support the engine, a transmission mount that is mounted between the transmission of the power train and the vehicle body to support the transmission, and a roll rod that controls the rolling behavior of the power train, and the like.

The main components of the mounting members are formed of an insulator (rubber) for insulating the actual vibration. However, since direct connection of the insulator between the power train and the vehicle body is difficult, the mounting member includes a bracket that is bolted to the vehicle body in combination with the insulator.

However, in a case in which the bracket included in the mounting member (in particular, the transmission mount) is weak in structure, vibration may be amplified by superimposition of gear noise (high frequency), or the like, generated from gears in the transmission on the natural frequency of the bracket, which may lead to degradation of Noise, Vibration & Harshness (NVH) performance.

Accordingly, in order to strengthen the bracket structure combined with the insulator (rubber), reinforcement may be carried out by adding separate structures using welding, or the like. However, while the reinforcement may provide advantages for the NVH performance, it typically results in an increase in weight and higher costs.

Figure 1:
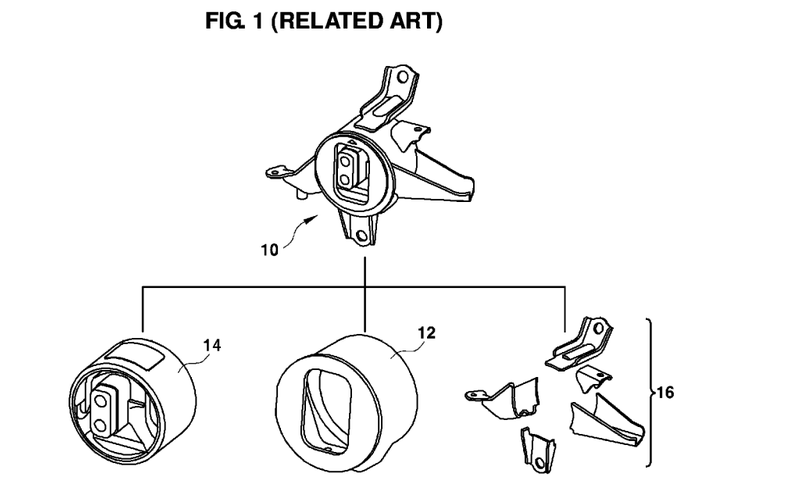
FIG. 1 (RELATED ART) is a view illustrating a transmission mount of the related art.
Figure 2:
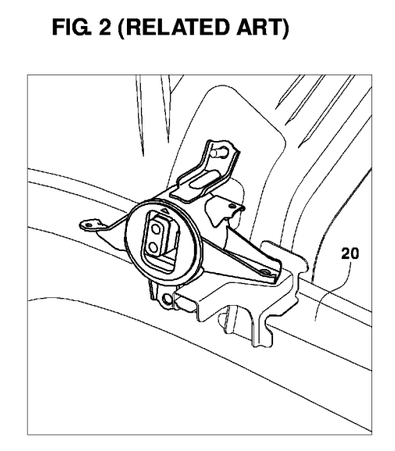
FIGS. 2 and 3 (RELATED ART) are views illustrating a structure of mounting the transmission mount according to the related art.
Figure 3:
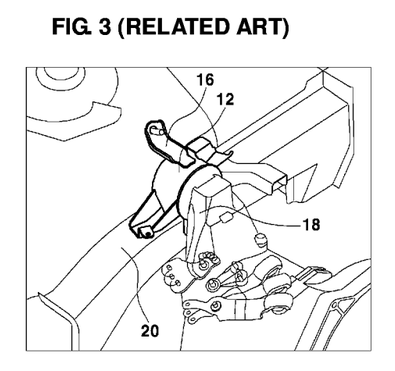

With reference to FIGS. 1-3 (RELATED ART), a transmission mount 10 of the related art includes a housing 12, a vibration insulation insulator 14 that is inserted into the housing 12, and a plurality of bridge brackets 16 that are connected to an outer diameter portion of the housing 12 and are bolted to a vehicle body 20.

As illustrated in FIGS. 2 and 3, the bridge bracket 16 is bolted to the vehicle body (for example, a side member), and the front portion of the insulator 14 exposed through the front portion of the housing 12 is connected to a transmission support bracket 18 to complete the mounting of the transmission mount.

However, in the above-described transmission mount of the related art, the bridge bracket is manufactured by welding many metal pieces of predetermined shapes so as to enhance the rigidity of the bridge bracket, and bolted to the vehicle body (for example, four-point bolting). For this reason, the transmission mount of the related art has disadvantages of lowered workability and higher cost caused by the complicated assembly structure.

The above information disclosed in this Background section is only for enhancement of understanding of the background of the disclosure and therefore it may contain information that does not form the prior art that is already known in this country to a person of ordinary skill in the art.

SUMMARY

An object of the present disclosure is to provide a transmission mount for a vehicle having an improved structure capable of being press-fitted to a vehicle body side member with only an insulator and without a bridge bracket, such that reduction in weight and cost can be achieved by eliminating the bridge bracket, and assembly workability can be improved by eliminating a bolting operation.

In one aspect, the present disclosure provides a transmission mount for a vehicle, including a housing that is configured to be inserted and mounted in a mounting hole formed in a side member of a vehicle body, an insulator that has a plurality of support blades formed integrally on an outer surface thereof to be inserted and mounted in the housing, a metal core that is inserted into the insulator, and an outer bracket that is inserted into the housing together with the insulator in a state of being in contact (i.e., close contact) with a surface of each of the support blades to be fastened to the housing.

In a preferred embodiment, the hosing may be provided with a pair of fitting holes at regular intervals along the circumferential direction, and fastening pins that are inserted into the fitting holes and fastened are integrally formed on an outer surface of the outer bracket.

In another preferred embodiment, a jig contact groove may be further formed at an area of the outer surface of the outer bracket between fitting pins.

In still another preferred embodiment, rubber may be vulcanized or an adhesive is coated on a surface of each of the fastening pins.

In yet another preferred embodiment, support bodies that are covered by the support blades of the insulator may be integrally formed at upper and lower positions on both sides of the metal core.

In still yet another preferred embodiment, buffer protrusions for defining positions that are covered by the insulator may be further formed on both sides of the metal core.

In still yet another preferred embodiment, a bolting hole that is bolted to the transmission support bracket may be formed at a front portion of the metal core.

In still yet another preferred embodiment, a rubber stopper for vibration insulation that is in contact with the transmission support bracket may be further attached to a front portion of the housing.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 4:
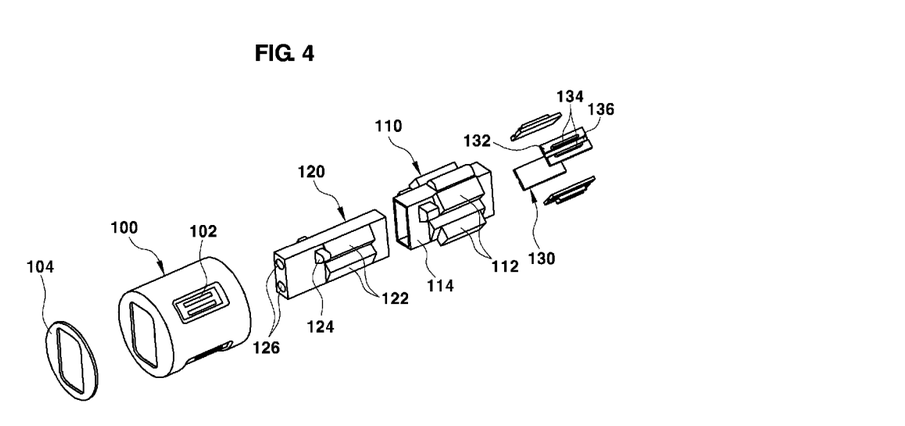
FIG. 4 is an exploded perspective view illustrating a transmission mount according to the present disclosure.
Figure 5:
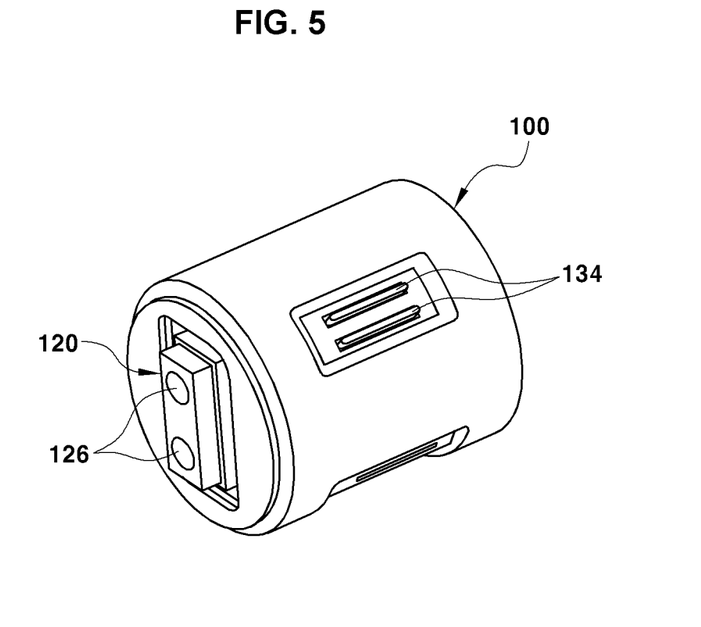
FIG. 5 is an assembled perspective view illustrating the transmission mount according to the present disclosure.

FIGS. 4 and 5 illustrate a transmission mount according to the present disclosure, and reference number 100 denotes a housing.

The housing 100 has a cylindrical shape in which a vertically elongated rectangular hole formed through a front portion and a rear portion is opened.

In addition, a pair of fitting holes 102 is formed in the housing 100 at regular intervals along the circumferential direction.

The housing 100 as described herein is configured to be inserted and mounted in a mounting hole 202 formed in a side member of a vehicle and is fixed in advance by welding or the like.

An insulator 110 having a metal core 120 embedded therein and made of rubber is inserted into the housing 100. The metal core 120 serves as a rigid reinforcement and a skeleton inside the insulator 110, and the insulator 110 is responsible for performing actual vibration insulation inside the housing 100.

As shown in FIG. 5, it is preferable that the metal core 120 is provided in a rectangular parallelepiped shape, and at upper and lower positions of both sides of the metal core 120. In addition, support bodies 122 to be covered by support blades 112 are integrally protruded, as described herein.

Further, buffer protrusions 124 for defining positions, which are to be covered by the insulator 110, are integrally formed at positions in front of the support bodies 122 on both sides of the metal core 120.

In the front portion of the metal core 120, bolting holes 126 are formed, where bolts are fastened by bolting to the transmission support bracket.

For example, when the insulator 110 is vulcanized, the vulcanization is performed with the metal core 120 being inserted into a metal mold for vulcanization. Therefore, the insulator 110 is formed in a state of covering the circumferential surface of the metal core 120.

Figure 7:
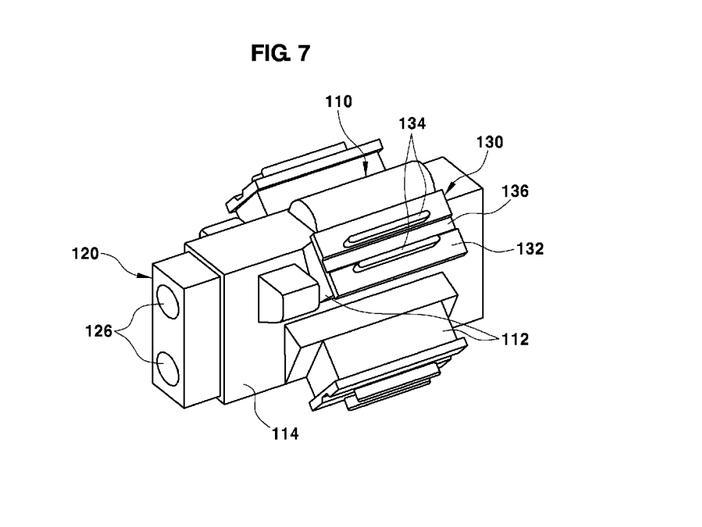
FIG. 7 is a perspective view illustrating a state in which the metal core of the transmission core according to the present disclosure, an insulator, and an outer bracket are assembled together.

The insulator 110 includes a rectangular body portion 114 and a plurality of support blades 112 that are integrally formed at upper and lower positions on both sides of the rectangular body portion 114 as illustrated in FIG. 7, and the support blades 112 are arranged in an "X" shape around the rectangular body portion 114.

Figure 6:
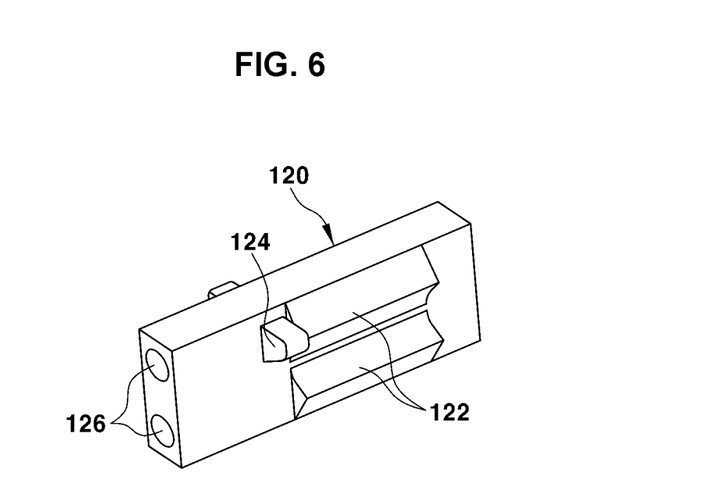
FIG. 6 is a perspective view illustrating a metal core of the transmission mount according to the present disclosure.

As illustrated in FIGS. 6 and 7, upper ones of the support bodies 122 of the metal core 120 are formed to be inclined downward and lower ones are formed to be inclined upward. As a result, the insulator 110 covering the metal core 120 is in a locking state in which it is fixed in place without turning right and left.

In addition, the outer bracket 130 is in close contact with the outer surface of each of the support blades 112 of the insulator 110 so as to be inserted into the housing 100 together with the insulator 110 and is fastened to the housing 100.

In particular, since the insulator 110 is formed of rubber and is required to be displaced vertically and horizontally for vibration insulation, the insulator 110 is not directly fastened to the metal housing 100. Instead, the metal outer bracket 130 in close contact with the outer surface of each of the support blades 112 of the insulator 110 is inserted into a fitting hole 102 of the housing 100 and is fastened to the housing 100.

To this end, the outer bracket 130 includes a flat-plate body 132 to be in close contact with the outer surface of each of the support blades 112 of the insulator 11, and fastening pins 134 that protrudes from the outer surface of the flat-plate body 132 are inserted into the fitting holes 102 and fastened.

In this case, when the fastening pin 134 of the metal outer bracket 130 is fitted in the fitting hole 102, the fastening pin 134 is brought in metallic contact with the metal housing 100, which may lead to rattle joint when a clearance is generated between the fastening pin 134 and the fitting hole 102.

For this reason, the rubber is vulcanized or an adhesive is coated on the surface of the fastening pin 134 of the outer bracket 130 to prevent metal-to-metal contact and compensate for the rattle joint when a clearance is generated.

Further, a jig contact groove 136 is formed at an area of the outer surface of the outer bracket 130 between fastening pins 134.

The reason why the jig contact groove 136 is formed is to seat a resilient fin 142 of a jig 140, which is a kind of tool for simultaneously inserting, into the housing 100, the insulator 110 in which the metal core 120 is embedded and the outer bracket 130 in close contact with the support blades 112 of the insulator 110, as described below.

Figure 12:
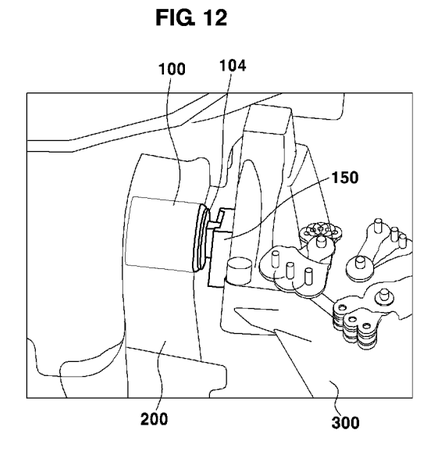
FIG. 12 a schematic view illustrating a mounted state of the transmission mount according to the present disclosure.

As illustrated in FIG. 12, a rubber stopper 104 for vibration insulation, which is in close contact with a transmission support bracket 150, is attached to the front portion of the housing 100. The rubber stopper 104 serves to prevent direct contact between the metal housing 100 and the metal transmission support bracket 150, and protect against micro vibration.

Hereinafter, a process of assembling the transmission mount for a vehicle according to the present disclosure having the above-described structure will be described.

Figure 8:
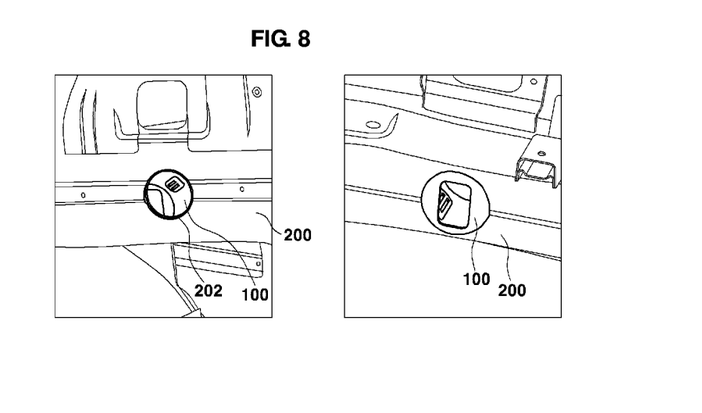
FIGS. 8 to 10 are views illustrating a process of assembling the transmission mount according to the present disclosure.
Figure 9:
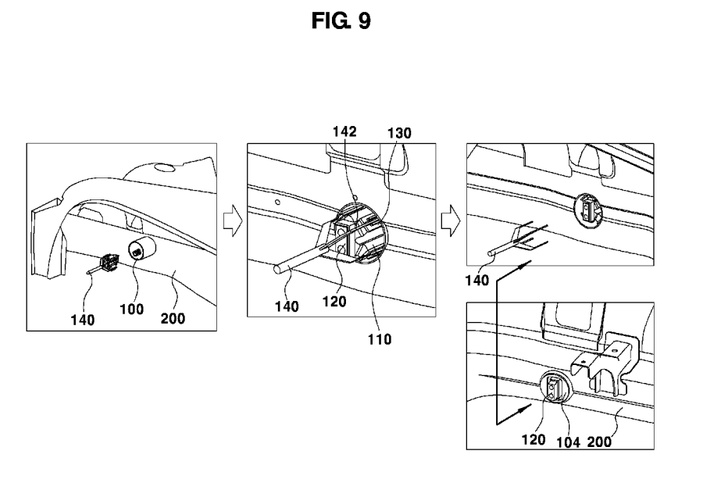
Figure 10:
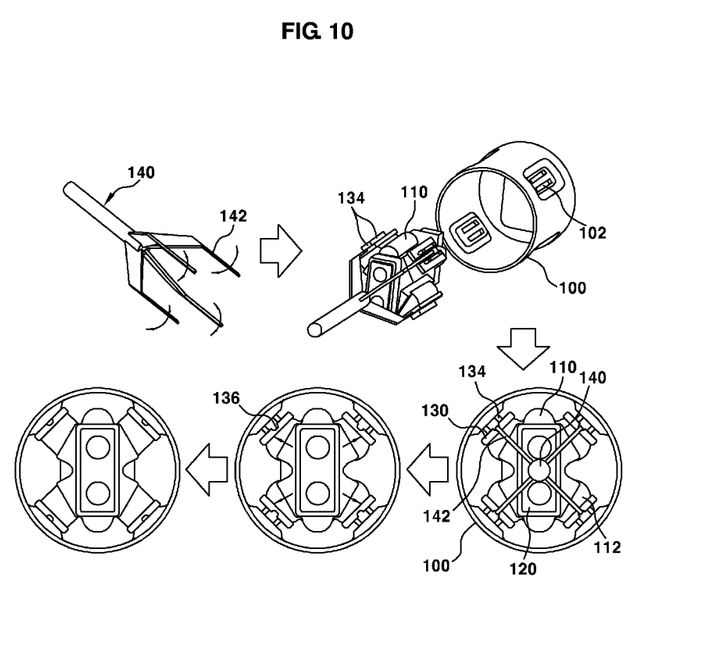

FIGS. 8 to 10 illustrate a process of assembling the transmission mount according to the present disclosure.

First, the housing 100 is inserted into the mounting hole 202 formed in the side member 200 of the vehicle body, and then fixed in advance by welding or the like (see FIG. 8).

Next, the outer bracket 130 is brought into close contact with each of the support blades 112 of the insulator 110 having the metal core 120 therein, and then the resilient fin 142 of the jig 140 is seated in the jig contact groove 136 of the outer bracket 130.

As the outer bracket 130 is pressed by the seated resilient fin 142 of the jig 140, the outer bracket 130 is brought into close contact with the surface of each of the support blade 112, which leads to the compressed and deformed state of each of the support blades 112.

Next, an operator holds the jig 140 and inserts the insulator 110 having the metal core 120 therein and the outer bracket 130 into the housing 100 through a rear opening of the housing 100.

Here, the operator pushes the jig 140 until the buffer protrusions 124 for defining positions of the metal core 120, which are covered by the insulator 110, touch the wall surface around the front rectangular hole of the housing 100.

When the jig 140 is removed, that is, the resilient fin 142 of the jig 140 is removed from the jig contact groove 136 of the outer bracket 130, the compressed and deformed support blade 112 is expanded to the original level, which, in turn, forces the outer bracket 130 to be pushed out and the fastening pin 134 of the outer bracket 130 to be inserted into the fitting hole 102 of the housing 100 and fastened. When the fastening pin 134 is fastened, the process in which the insulator 110 having the metal core 120 therein and the outer bracket 130 are mounted in the housing 100 is completed.

Next, as illustrated in FIG. 12, the rubber stopper 104 for vibration insulation is brought into close contact with the front portion of the housing 100, and the transmission support bracket 150 connected to the transmission 300 is tightly fitted into the bolting hole 126 of the metal core 120 exposed through the front rectangular hole of the housing 100 and bolted to it, which makes the transmission mount according to the present disclosure connected to the transmission in a manner that allows vibration insulation.

Figure 11:
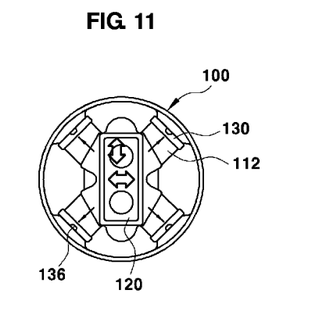
FIG. 11 is a sectional view illustrating the transmission mount according to the present disclosure which is performing a vibration insulating operation.

Therefore, as illustrated in FIG. 11, the vibration transmitted from the power train including the transmission is absorbed while the insulator 110 is deformed vertically and horizontally.

The present disclosure provides the following effects through the above-mentioned descriptions.

First, the transmission mount is improved so as to have the structure capable of being press-fitted to the side member of the vehicle only with the insulator, which makes it possible to eliminate the bridge bracket included in the transmission mount, and thus reduce the number of parts and reduce weight and cost.

Second, since the transmission mount is press-fitted into the side member of the vehicle body using the jig-type tool, the operation of mounting the transmission mount can be easily performed, and assembly workability can be improved by eliminating the existing bolting operation for mounting the transmission mount.

In addition, although the embodiments of the present disclosure are described above in detail, the protection scope of the present disclosure is not limited thereto. Therefore, various changes and improved forms by those skilled in the art using basic concepts of the present disclosure defined in the following claims belongs to the protection scope of the present disclosure.

What is claimed is:

1. A transmission mount for a vehicle, comprising:
   a housing that is configured to be inserted and mounted in a mounting hole formed in a side member of a vehicle body;
   an insulator that has a plurality of support blades formed integrally on an outer surface thereof to be inserted and mounted in the housing;
   a metal core that is inserted into the insulator; and an outer bracket that is inserted into the housing together with the insulator in a state of being in contact with a surface of each of the plurality of support blades to be fastened to the housing, wherein the housing is provided with a pair of fitting holes at regular intervals along a circumferential direction, and fastening pins that are inserted into the fitting holes and fastened are integrally formed on an outer surface of the outer bracket.

2. The transmission mount of claim 1, wherein a jig contact groove is further formed at an area of the outer surface of the outer bracket between fitting pins.

3. The transmission mount of claim 1, wherein the fastening pins each have a surface formed with vulcanized rubber or an adhesive coated on the surface of the fastening pins.

4. The transmission mount of claim 1, wherein support bodies that are covered by the plurality of support blades of the insulator are integrally formed at upper and lower positions on both sides of the metal core.

5. The transmission mount of claim 1, wherein buffer protrusions for defining positions that are covered by the insulator are further formed on both sides of the metal core.

6. The transmission mount of claim 1, wherein a bolting hole that is bolted to a transmission support bracket is formed at a front portion of the metal core.

7. The transmission mount of claim 1, wherein a rubber stopper for vibration insulation that is in contact with a transmission support bracket is further attached to a front portion of the housing.

* * * * *